US012397565B2

(12) United States Patent
Kobayashi et al.

(10) Patent No.: US 12,397,565 B2
(45) Date of Patent: Aug. 26, 2025

(54) PRINTING DEVICE AND NON-TRANSITORY COMPUTER READABLE STORAGE MEDIUM

(71) Applicant: BROTHER KOGYO KABUSHIKI KAISHA, Nagoya (JP)

(72) Inventors: Akihito Kobayashi, Konan (JP); Yugo Fukui, Kariya (JP); Noriyuki Kawamata, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 241 days.

(21) Appl. No.: 18/115,526

(22) Filed: Feb. 28, 2023

(65) Prior Publication Data

US 2023/0271430 A1 Aug. 31, 2023

(30) Foreign Application Priority Data

Feb. 28, 2022 (JP) ................................. 2022-030090

(51) Int. Cl.

| | |
|---|---|
| ***B41B 11/00*** | (2006.01) |
| ***B41J 2/21*** | (2006.01) |
| ***B41J 11/00*** | (2006.01) |
| *B41J 2/165* | (2006.01) |

(52) U.S. Cl.

CPC .......... *B41J 11/0024* (2021.01); *B41J 2/2114* (2013.01); *B41J 2/16508* (2013.01); *B41J 2/2117* (2013.01)

(58) Field of Classification Search

CPC .... B41J 2/16508; B41J 2/2114; B41J 3/4078; B41J 11/0015; B41J 11/0024; B41J 19/207; B41J 2/2117; D06P 1/6533; D06P 5/002; D06P 5/30

See application file for complete search history.

(56) References Cited

U.S. PATENT DOCUMENTS

2010/0080911 A1* 4/2010 Okada .................. B41M 5/0017 427/256
2010/0302307 A1* 12/2010 Tahara ................... C09D 11/54 427/256
2011/0279517 A1* 11/2011 Katsuragi .............. B41J 2/2114 524/548
2019/0283458 A1 9/2019 Ohnishi et al.
2022/0379615 A1* 12/2022 Ishikawa ................ B41J 2/1652

FOREIGN PATENT DOCUMENTS

JP 2010214729 * 9/2010 ................ B41J 3/04
JP 2019-155726 7/2022

* cited by examiner

*Primary Examiner* — Anh T Vo
(74) *Attorney, Agent, or Firm* — K&L Gates LLP

(57) ABSTRACT

A printing device includes a head including a nozzle configured to eject ink, a platen configured to support a printing medium to which a pretreatment liquid is applied, the pretreatment liquid containing a volatile component that reacts with the ink, and a controller configured to cause the head to perform an ejection drive that causes the nozzle to eject the ink and a non-ejection drive that causes the nozzle not to eject the ink, and cause the head to perform the non-ejection drive in at least a part of a period other than an ejection period in which the head performs the ejection drive to cause the nozzle to eject the ink toward the printing medium, in a case where the head and the printing medium face each other.

10 Claims, 11 Drawing Sheets

PRINTING DEVICE AND NON-TRANSITORY COMPUTER READABLE STORAGE MEDIUM

REFERENCE TO RELATED APPLICATIONS

This application claims priority from Japanese Patent Application No. 2022-030090 filed on Feb. 28, 2022. The entire content of the priority application is incorporated herein by reference.

BACKGROUND ART

A related art describes a printing device including an inkjet head that evaporates a liquid pretreatment agent before ejecting a color ink onto a printing medium to which the pretreatment agent is applied, and then ejects the color ink. Accordingly, drying of the pretreatment agent can be appropriately accelerated before the color ink is ejected.

DESCRIPTION

However, in the printing device described in the related art, in a case where the pretreatment agent applied to the printing medium volatilizes during printing, a volatile component of the pretreatment agent may react with the ink in a nozzle of the inkjet head. A reaction between the ink and the volatile component of the pretreatment agent causes problems such as aggregation of the ink in the nozzle, occurrence of ejection failure, and occurrence of color change in the ink.

Therefore, an object of the present disclosure is to provide a printing device and a non-transitory computer readable storage medium storing a control program capable of reduce occurrence of a problem due to a reaction between ink in a nozzle and a volatile component of a pretreatment liquid.

The printing device includes a controller configured to cause a head to perform an ejection drive that causes a nozzle to eject ink and a non-ejection drive that causes the nozzle not to eject the ink; and cause the head to perform the non-ejection drive in at least a part of a period other than an ejection period in which the head performs the ejection drive to cause the nozzle to eject the ink toward a printing medium, in a case where the head and the printing medium face each other.

The non-transitory computer readable storage medium stores the control program. The control program, when executed by a controller of a printing device, causes the controller to cause a head to perform an ejection drive that causes a nozzle to ejecting ink from the nozzle and a non-ejection drive that causes the nozzle not to eject the ink, and the head to perform the non-ejection drive in at least a part of a period other than an ejection period in which the head performs the ejection drive to cause the nozzle to eject the ink toward a printing medium, in a case where the head and the printing medium face each other.

In a case where a head and a printing medium face each other, it is possible to cause the head to perform a non-ejection drive in at least a part of a period other than an ejection period. It is possible to apply vibration, by the non-ejection drive, to ink to an extent that the ink is not ejected from a nozzle, and to stir ink in the vicinity of a meniscus and ink upstream of the meniscus. As described above, by performing the non-ejection drive in at least the part of the period other than the ejection period, the ink in the vicinity of the meniscus that reacts with a volatile component of a pretreatment liquid is stirred with the ink on the upstream side. Therefore, it is possible to reduce an occurrence of a problem due to a reaction between the ink in the nozzle and the volatile component of the pretreatment liquid.

A printing device 1 according to the present disclosure will be described with reference to the drawings. In the following description, an up-down direction and a front-rear direction ("intersecting direction" of the present disclosure) are defined with reference to a state (state in FIG. 1) in which the printing device 1 is provided in a usable manner, and a left-right direction ("one direction" of the present disclosure) is defined in a case where the printing device 1 is viewed from the front.

Figure 1:
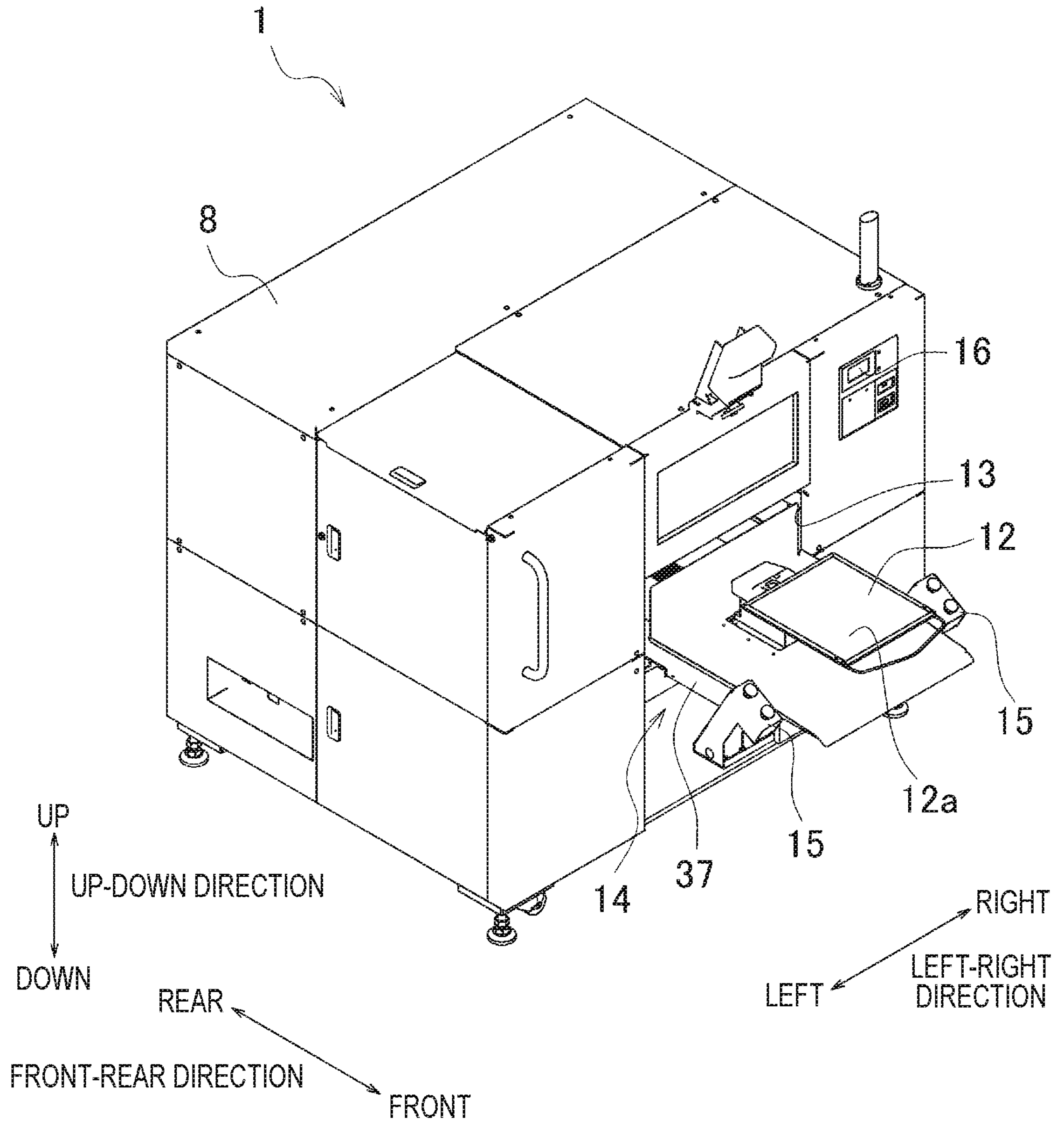
FIG. 1 is a schematic perspective view of a printing device according to the present disclosure.

The printing device 1 shown in FIG. 1 is an inkjet printer, and performs printing by ejecting ink onto a printing medium. The printing device 1 can print a color image, on the printing medium, using inks of five colors, that is, white, black, yellow, cyan, and magenta inks. The printing medium is a fabric, paper, or the like. In the present embodiment, the printing medium is, for example, a T-shirt containing polyester fibers. In a case where the printing device 1 performs the printing on the printing medium (T-shirt), the printing medium to which a pretreatment liquid is applied in advance is disposed on the platen 12. The pretreatment liquid reacts with the ink ejected onto the pretreatment liquid to aggregate components of the ink, thereby reducing an occurrence of smudge. A volatile component of the pretreatment liquid contains an organic acid such as formic acid.

Hereinafter, the white ink among the inks of five colors is referred to as a "white ink" ("first ink" of the present disclosure). Among the inks of five colors, the inks of four colors, which are the black, cyan, yellow, and magenta inks, are collectively referred to, or when any one of the inks is not specified, the inks of four colors are referred to as "color inks" ("second ink" of the present disclosure). When the white ink and the color inks are collectively referred to, or when any one of the white ink and the color inks is not specified, the white ink and the color inks are simply referred to as an "ink". The white ink is used for printing a portion representing white of an image or a base of the color inks. The color inks are ejected onto the base formed by the white ink, and is used for printing the color image.

Figure 2:
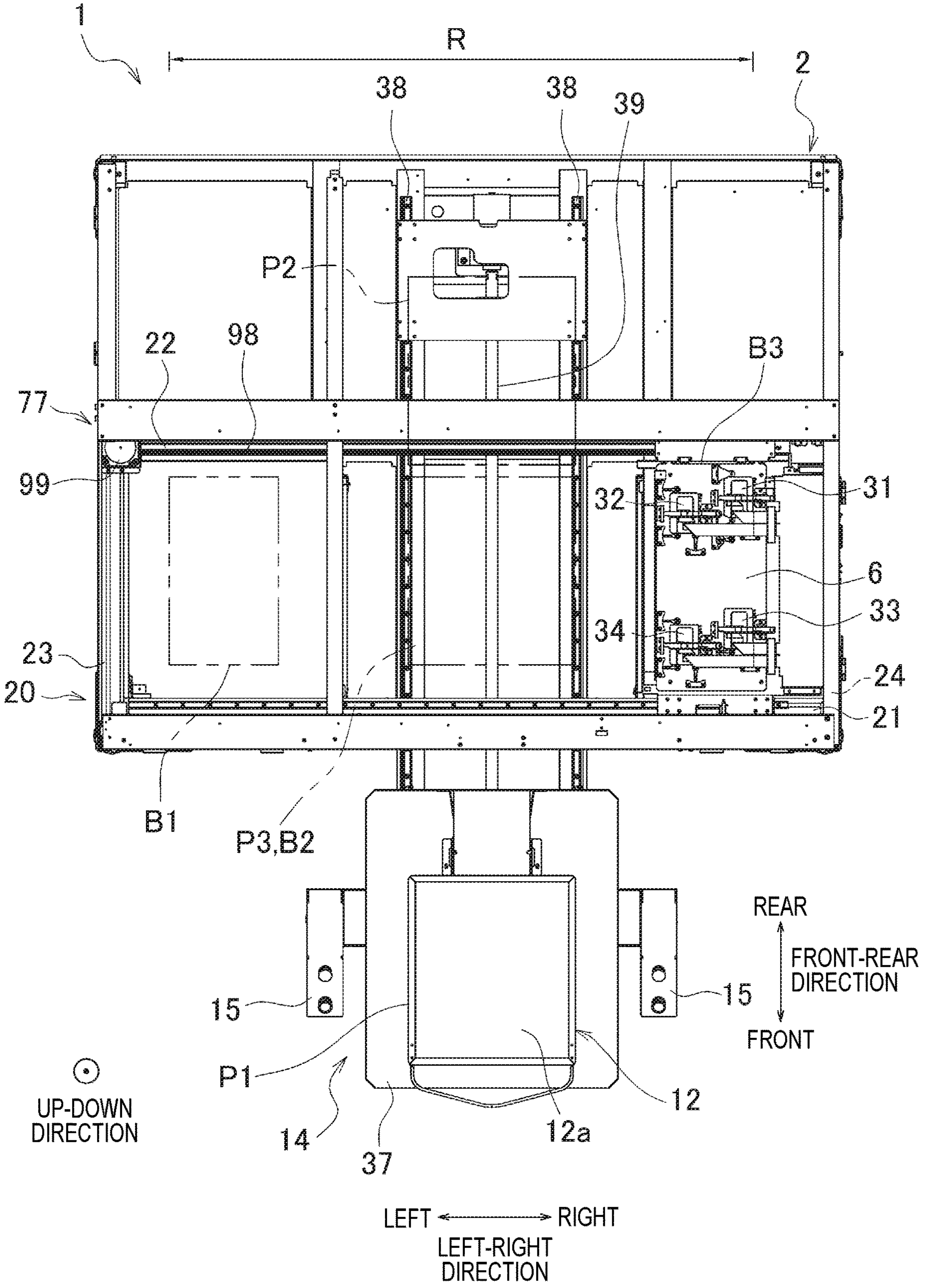
FIG. 2 is a plan view showing an internal structure of the printing device shown in FIG. 1.

An external configuration of the printing device 1 will be described with reference to FIGS. 1 to 3. As shown in FIG. 1, the printing device 1 includes a housing 8, the platen 12, a conveyance mechanism 14, operation portions 15, and a display screen 16. The housing 8 has a substantially rectangular parallelepiped shape, and a rectangular platen opening 13 is formed substantially at a center of a front surface in the left-right and up-down directions. Five cartridges (not shown) containing the inks of five colors are housed in the housing 8. As shown in FIG. 2, the platen 12 is formed of a plate-shaped member having a substantially rectangular planar shape. An upper surface of the platen 12 is a support surface 12*a* configured to support the printing medium.

The operation portions 15 are provided at left and right end portions of a platen support portion 37 (to be described later) protruding forward from the platen opening 13. The operation portions 15 output information corresponding to an operation of a user to a controller 80 to be described later. The user can input a print start command (including print data) for starting the printing by the printing device 1 to the controller 80 by operating the operation portions 15. The display screen 16 is provided at an upper right portion of the front surface of the housing 8 than the platen opening 13. The display screen 16 displays various types of information. Therefore, an operator operates the printing device 1 from a front side of the printing device 1.

The conveyance mechanism 14 conveys the platen 12, on which the printing medium is disposed, between an inside and an outside of the housing 8 through the platen opening 13. The platen 12 is disposed at a printing position P3, which is indicated by a two-dot chain line in FIG. 2, inside the housing 8 shown in FIG. 2, and the inks are ejected from heads 30 to be described later to perform the printing. As shown in FIG. 2, the conveyance mechanism 14 includes the platen support portion 37, a pair of left and right rails 38, a transmission member 39, and a sub-scanning motor 26 (see FIG. 5).

Figure 3:
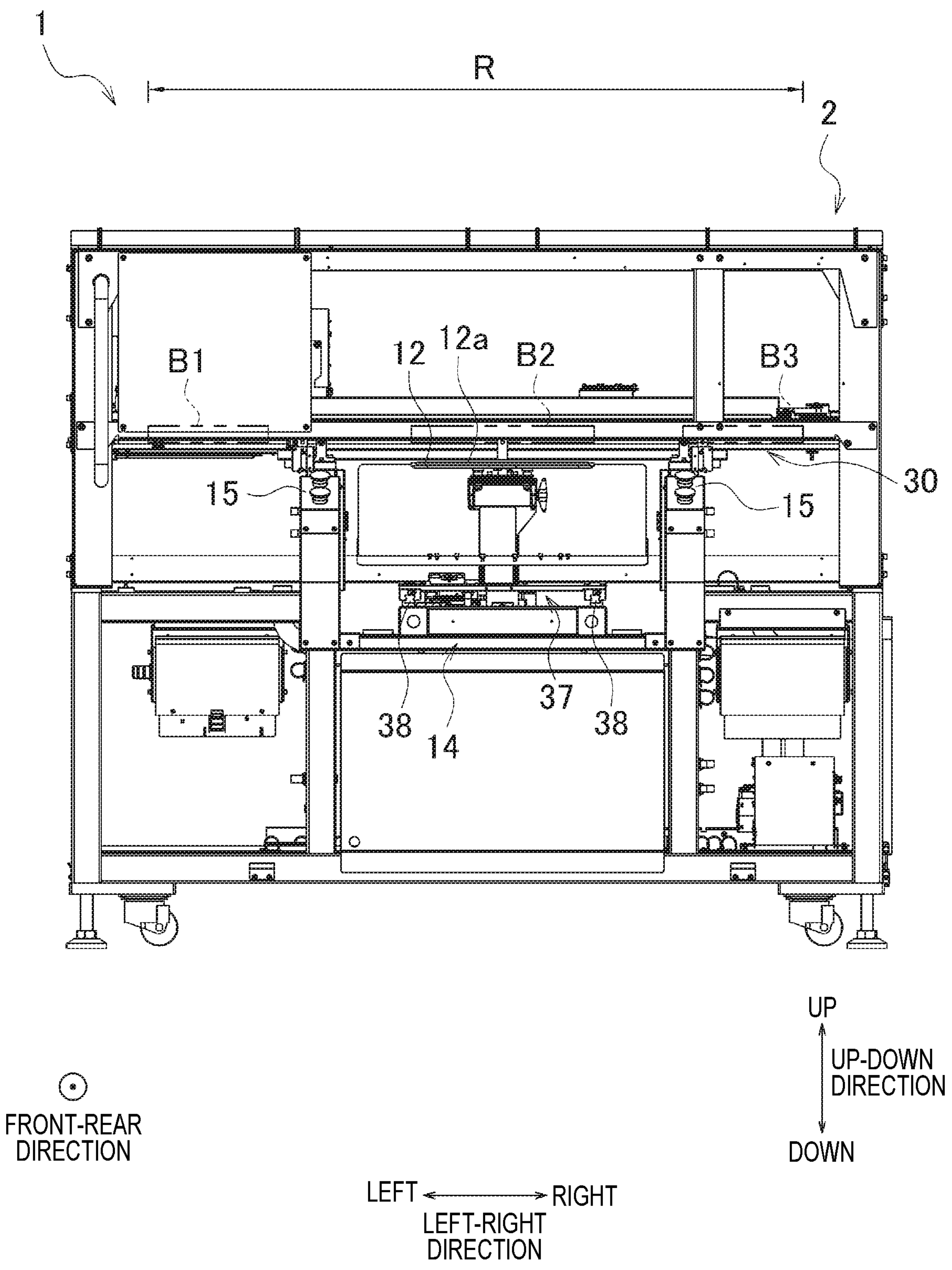
FIG. 3 is a front view showing the internal structure of the printing device shown in FIG. 1.

As shown in FIGS. 2 and 3, the platen support portion 37 is configured to support the platen 12 from below. The pair of left and right rails 38 extend in the front-rear direction and are configured to support the platen support portion 37 to be movable in the front-rear direction. Front ends of the pair of rails 38 are located forward than the front surface of the housing 8. The transmission member 39 is connected to the platen support portion 37 and the sub-scanning motor 26, and is configured to move the platen support portion 37 in the front-rear direction along a conveyance path defined by the pair of left and right rails 38, according to driving of the sub-scanning motor 26. That is, the platen 12 moves in the front-rear direction by the driving of the sub-scanning motor 26. In the present embodiment, the front-rear direction is a sub-scanning direction. The left-right direction is a scanning direction of the head 30 described later. In the present embodiment, the left-right direction is a main scanning direction. In the following description, the left-right direction may be referred to as a main scanning direction, and the front-rear direction may be referred to as a sub-scanning direction.

In a state in which the platen 12 is disposed in front of the front surface of the housing 8, that is, outside the housing 8, the operator disposes the printing medium on the support surface 12*a* of the platen 12. That is, a position of the platen 12 shown in FIG. 2 is a support position P1 at which the printing medium is supported by the platen 12. Before printing on the printing medium, the platen 12 moves from the support position P1 to a pre-printing standby position P2, which is indicated by a two-dot chain line in FIG. 2. The pre-printing standby position P2 is located behind the printing position P3 and at a rear end portion of a conveyance path of the platen 12. The platen 12 disposed at the pre-printing standby position P2 does not face the heads 30 even in a case where the heads 30 to be described later move in the main scanning direction. The printing position P3 is a position, of the conveyance path of the platen 12, that overlaps in the up-down direction with movement paths of the heads 30 in the main scanning direction, which will be described later. The movement paths of the heads 30 in the main scanning direction are paths between a rear end of the rearmost head 30 (white head 31) and a front end of the frontmost head 30 (color head 34).

An internal structure of the printing device 1 will be described with reference to FIGS. 2 to 4. As shown in FIG. 2, the printing device 1 includes, inside the housing 8, a frame body 2, heads 31 to 34, and a moving mechanism 77. The frame body 2 is formed in a lattice shape by a plurality of shafts extending in the front-rear direction, the left-right direction, or the up-down direction. The moving mechanism 77 includes a guide shaft 20 fixed to the frame body 2 and a carriage 6 fixed to the frame body 2. As shown in FIG. 2, the guide shaft 20 includes a front shaft 21, a rear shaft 22, a left shaft 23, and a right shaft 24.

As shown in FIG. 2, the front shaft 21 is disposed at a front end portion of the frame body 2, and extends in the left-right direction from a left end portion to a right end portion of the frame body 2. The rear shaft 22 is disposed substantially at a center of the frame body 2 in the front-rear direction, and extends in the left-right direction from a left end portion to a right end portion of the frame body 2. The left shaft 23 is disposed at the left end portion of the frame body 2, and extends, in the front-rear direction, from a left end of the front shaft 21 to a left end of the rear shaft 22. The right shaft 24 is disposed at the right end portion of the frame body 2, and extends, in the front-rear direction, from a right end of the front shaft 21 to a right end of the rear shaft 22. The front shaft 21 and the rear shaft 22 support the carriage 6. The conveyance mechanism 14 is fixed to the frame body 2.

As shown in FIG. 2, the carriage 6 is supported by the front shaft 21 and the rear shaft 22 to be movable in the main scanning direction. The carriage 6 has a plate shape and extends in the front-rear and left-right directions. The carriage 6 extends from the front shaft 21 to the rear shaft 22.

Figure 4:
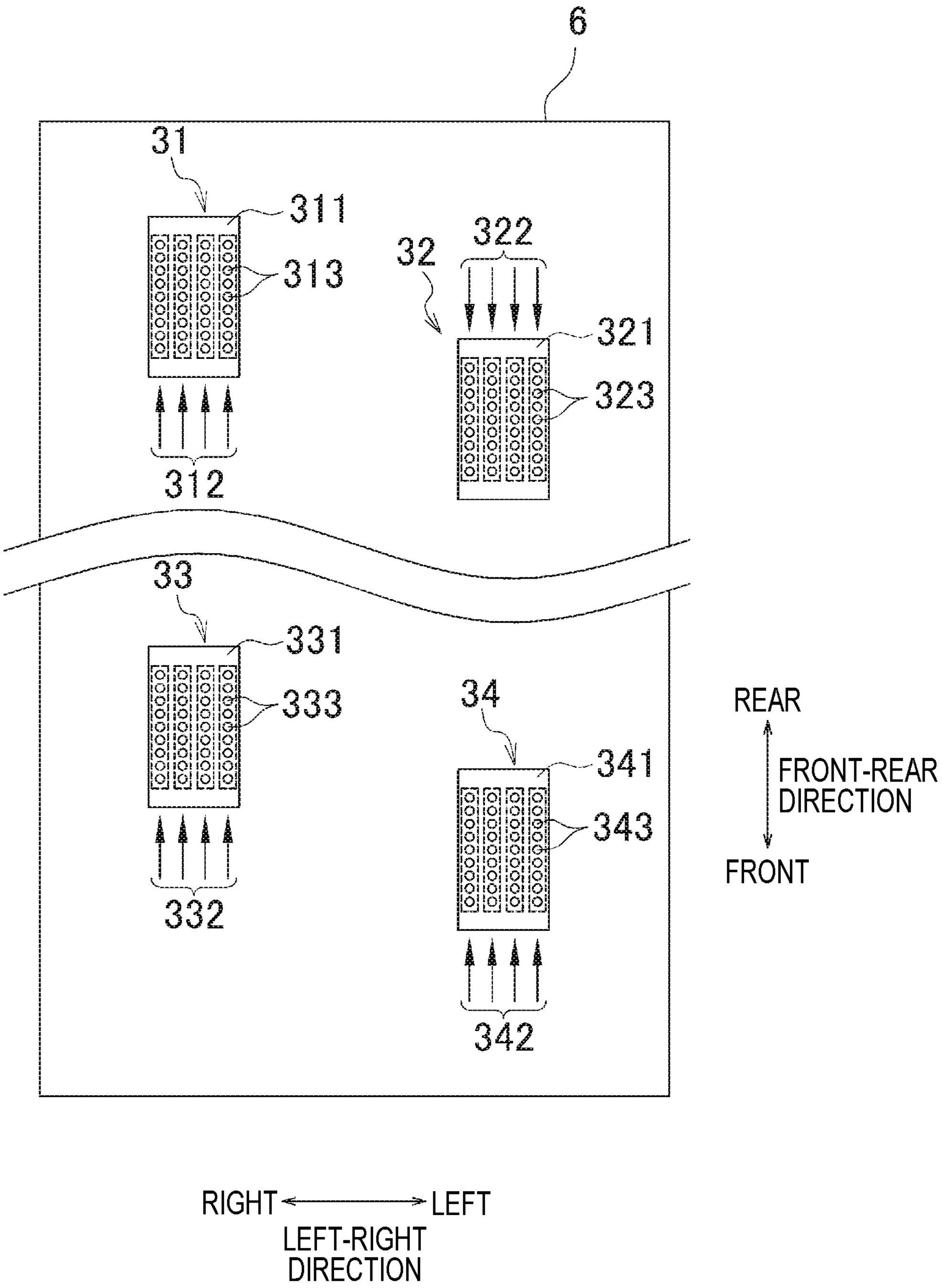
FIG. 4 is a schematic view of a carriage as viewed from below.

As shown in FIGS. 2 and 4, the carriage 6 is provided with the white heads 31 and 32 ("first head portion" of the present disclosure) and the color heads 33 and 34 ("second head portion" of the present disclosure). The white heads 31 and 32 and the color heads 33 and 34 configure a "head" of the present disclosure.

The white heads 31 and 32 and the color heads 33 and 34 have the same structure, and have a rectangular parallelepiped shape in the present embodiment. Hereinafter, when the white heads 31 and 32 and the color heads 33 and 34 are collectively referred to, or when any one of them is not specified, the white heads 31 and 32 and the color heads 33 and 34 are referred to as the "heads 30". As shown in FIG. 4, the white heads 31 and 32 are located at a rear portion of the carriage 6. The white head 31 is located at a right rear portion of the carriage 6. The white head 32 is located on a left side of the white head 31, and is shifted to a front side with respect to the white head 31. A rear portion of the white head 32 overlaps a front portion of the white head 31 in the left-right direction.

As shown in FIGS. 2 and 4, the color heads 33 and 34 are located on a front side of the white heads 31 and 32. The color heads 33 and 34 are located at the same positions as the white heads 31 and 32, respectively, in the left-right direction. That is, the white heads 31 and 32 and the color heads 33 and 34 are arranged side by side along the sub-scanning direction. The color head 34 is located on a left side of the color head 33 and is shifted to a front side with respect to the color head 33. A rear portion of the color head 34 overlaps a front portion of the color head 33 in the left-right direction.

As shown in FIG. 4, a nozzle surface 311 is provided on a lower surface of the white head 31. The nozzle surface 311 extends in the front-rear and left-right directions. A plurality of nozzle rows 312 are formed on the nozzle surface 311. The plurality of nozzle rows 312 are arranged in the left-right direction. Each of the nozzle rows 312 includes a plurality of nozzles 313 arranged in a row at equal intervals in the front-rear direction. The plurality of nozzles 313 are openings and configured to eject the white ink downward.

Similarly to a configuration of the white head 31, nozzle surfaces 321, 331, and 341 are provided on lower surfaces of the white head 32 and the color heads 33 and 34, respectively. The nozzle surfaces 321, 331, and 341 extend in the front-rear and left-right directions. A plurality of nozzle rows 322, 332, and 342 are formed on the nozzle surfaces 321, 331, and 341, respectively. The plurality of nozzle rows 322, 332, and 342 are arranged in the left-right direction. The plurality of nozzle rows 322, 332, and 342, respectively, include a plurality of nozzles 323, 333, and 343. The respective plurality of nozzles 323, 333, and 343 are arranged in a row at equal intervals in the front-rear direction.

The plurality of nozzles 323 is configured to eject the white ink downward. The respective color inks of different colors correspond to the plurality of nozzle rows 332. That is, the plurality of nozzles 333 is configured to eject the respective inks of the colors corresponding to the plurality of nozzle rows 332 downward. The respective color inks of different colors correspond to the plurality of nozzle rows 342. The plurality of nozzles 343 is configured to eject the respective inks of the colors corresponding to the plurality of nozzle rows 342 downward.

As shown in FIGS. 2 and 4, a separation distance between the white head 31 and the color head 33 in the sub-scanning direction is larger than a separation distance between the two white heads 31 and 32 in the main scanning direction. A separation distance between the white head 32 and the color head 34 in the sub-scanning direction is larger than the separation distance between the two white heads 31 and 32 in the main scanning direction.

The moving mechanism 77 includes a driving belt 98 and a main scanning motor 99. The driving belt 98 is connected to a rear end portion of the carriage 6. The driving belt 98 is provided on the rear shaft 22 and extends in the left-right direction. A left end portion of the driving belt 98 is connected to the main scanning motor 99. In a case where the main scanning motor 99 is driven, the driving belt 98 moves the carriage 6 in the left-right direction along the front shaft 21 and the rear shaft 22. That is, the moving mechanism 77 moves the carriage 6 on which the head 30 is mounted in the main scanning direction. FIGS. 2 and 3 show a state in which the carriage 6 is located at a right end of a movement range R.

In FIGS. 2 and 3, the movement range R of the head 30 is indicated as a center of the carriage 6 in the left-right direction. As shown in FIG. 3, the head 30 is mainly disposed, by the moving mechanism 77, at one of three positions that are a maintenance position B1, an ejection position B2, and a head standby position B3. The maintenance position B1 is located at a left end portion of the movement range R of the head 30, and is a position where a maintenance is performed on the head 30 by a maintenance unit such as a wiper or a cap (not shown). The printing device 1 is configured to move the head 30 to the maintenance position B1 in a case where printing is not performed, and is configured to perform maintenance by the maintenance unit. The ejection position B2 is a position between the maintenance position B1 and the head standby position B3 and above the platen 12 disposed at the printing position P3 in the main scanning direction. In a state in which the head 30 is disposed at the ejection position B2, the head 30 ejects the ink in accordance with the print data, and the printing is performed on the printing medium on the platen 12 disposed at the printing position P3. The head standby position B3 is located at a right end of the movement range R of the head 30, and is a position at which the head 30 is disposed in a case where the operator performs the operation such as cleaning the head 30. For example, the printing device 1 is configured to move the head 30 to the head standby position B3 and is configured to cause the head 30 to stand by based on an instruction input from the operation portions 15 by the operation of the user.

In the printing device 1, the platen 12 is moved in the sub-scanning direction by the driving of the sub-scanning motor 26 at the printing position P3, and the carriage 6 is moved in the main scanning direction by the driving of the main scanning motor 99 at the ejection position B2, whereby the printing medium is moved relative to the head 30 in the sub-scanning direction and the main scanning direction.

An action of moving the head 30 in the main scanning direction and ejecting the ink onto the printing medium in a case where the head 30 faces the printing medium, is referred to as "ejection scanning". The printing device 1 is configured to repeat the ejection scanning and the movement of the platen 12 in the sub-scanning direction to perform the printing on the printing medium. For example, the printing device 1 is configured to eject the white ink from the white heads 31 and 32 in the ejection scanning to form the base on the printing medium. The printing device 1 is configured to eject the color inks from the color heads 33 and 34 to print the color image onto the base formed on the printing medium, in the ejection scanning.

An electrical configuration of the printing device 1 will be described with reference to FIG. 5. The printing device 1 includes the controller 80. The controller 80 includes a CPU 81, a ROM 82, a RAM 83, and a flash memory 84. The CPU 81 controls the printing device 1 and is electrically connected to the ROM 82, the RAM 83, and the flash memory 84. The ROM 82 is configured to store a control program for the CPU 81 to control operation of the printing device 1, information required by the CPU 81 in a case where various programs are executed, and the like. The ROM 82 is configured to store a position of the carriage 6 (head 30) based on a rotation angle of the main scanning motor 99, for example, and is configured to store the position of the platen 12 based on a rotation angle of the sub-scanning motor 26. The RAM 83 temporarily stores various data and the like used in the control program. The flash memory 84 is nonvolatile and is configured to store the print data and the like for printing.

Figure 5:
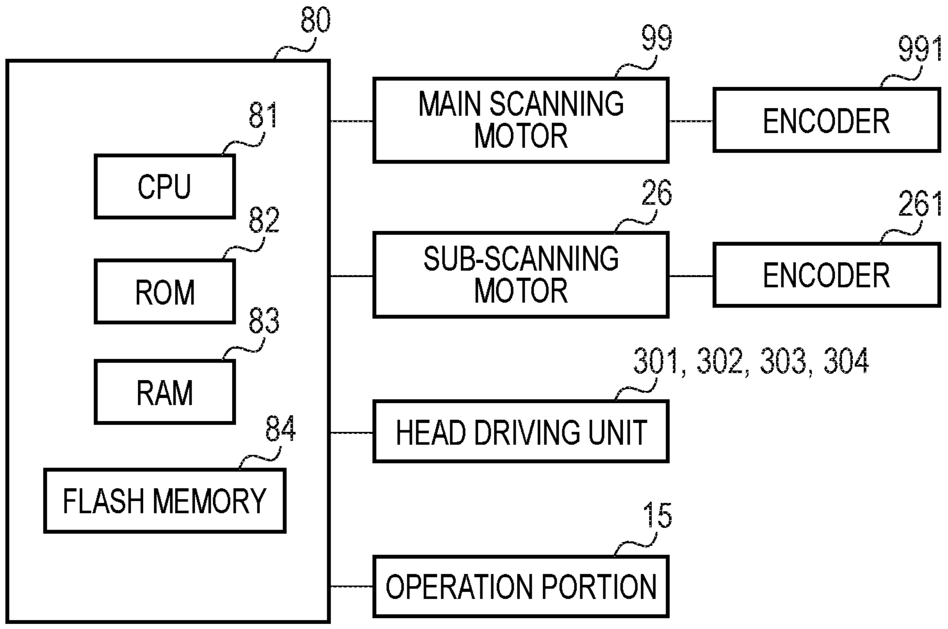
FIG. 5 is a block diagram showing an electrical configuration of the printing device shown in FIG. 1.

As shown in FIG. 5, the main scanning motor 99, the sub-scanning motor 26, four head driving units 301 to 304, and the operation portions 15 are electrically connected to the controller 80. The main scanning motor 99, the sub-scanning motor 26, and the head driving units 301 to 304 are driven under control of the controller 80.

The main scanning motor 99 and the sub-scanning motor 26 are provided with encoders 991 and 261, respectively. The encoder 991 is configured to detect the rotation angle of the main scanning motor 99 and is configured to output a detection result to the controller 80. The encoder 261 is configured to detect the rotation angle of the sub-scanning motor 26 and is configured to output a detection result to the controller 80.

The four head driving units 301 to 304 correspond to the white heads 31 and 32 and the color heads 33 and 34 in this order, and are provided in the heads 31 to 34. Each of the head driving units 301 to 304 includes a plurality of driving elements, which are piezoelectric elements or heating elements, configured to selectively apply energy to the inks in a plurality of individual flow paths communicating with the respective plurality of nozzles of the head 30. The head driving units 301 to 304 is configured to drive to apply energy to the inks in the white heads 31 and 32 and the color heads 33 and 34, and is configured to selectively eject the ink from the corresponding nozzles 313, 323, 333, and 343.

Figure 6:
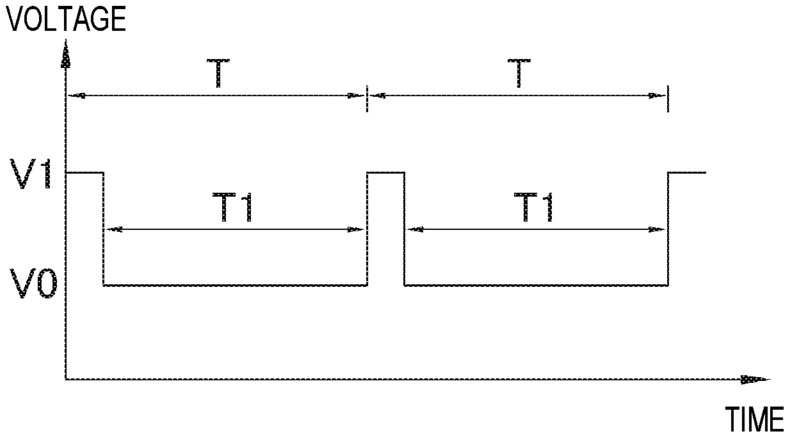
FIG. 6 is a waveform diagram of pulse signals output from a controller in a case where an ejection drive is performed.

An ejection drive that causes the nozzle of the head 30 to eject the ink and a non-ejection drive that causes the nozzle of the head 30 not to eject the ink will be described. The ejection drive is an operation of applying the energy to the ink in the head 30 and causing the corresponding nozzle to eject the ink by driving the head driving units 301 to 304. That is, the controller 80 is configured to output a pulse signal, shown in FIG. 6, having a pulse width T1 to the corresponding driving elements of the head driving units 301 to 304, during one printing cycle T. The pulse width T1 is long enough for the ink to be ejected from the head 30. In a case where the ejection drive is performed in a state in which the head 30 and the printing medium face each other, the ink ejected from the corresponding nozzle lands on the printing medium, and the base or the image is formed on the printing medium. The one printing cycle T is a time required for the printing medium and the head 30 to move relative to each other by a unit distance corresponding to a printing resolution in the main scanning direction.

Figure 7:
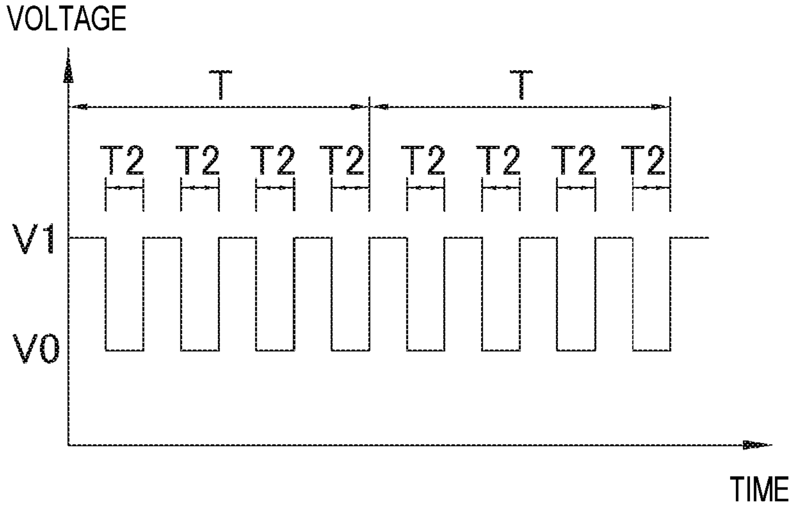
FIG. 7 is a waveform diagram of pulse signals output from the controller in a case where a non-ejection drive is performed.

The non-ejection drive is an operation of applying the energy to the ink in the head 30 within a range in which the nozzle of the head 30 does not eject the ink by driving the head driving units 301 to 304, and vibrating the ink in the corresponding nozzle. That is, the controller 80 is configured to output a pulse signal, shown in FIG. 7, having a pulse width T2 to the corresponding driving elements of the head driving units 301 to 304, during the one printing cycle T. The pulse width T2 has a length such that the ink is not ejected from the head 30, and is shorter than the pulse width T1. In the non-ejection drive, the energy may be applied to the ink in the head 30 within a range in which the ink is not ejected from the head 30 by applying a voltage smaller than a voltage V1 at the time of the ejection drive. In a case where the non-ejection drive is performed, ink in the vicinity of a meniscus and ink upstream of the meniscus are stirred.

<Control During Printing>

Figure 8:
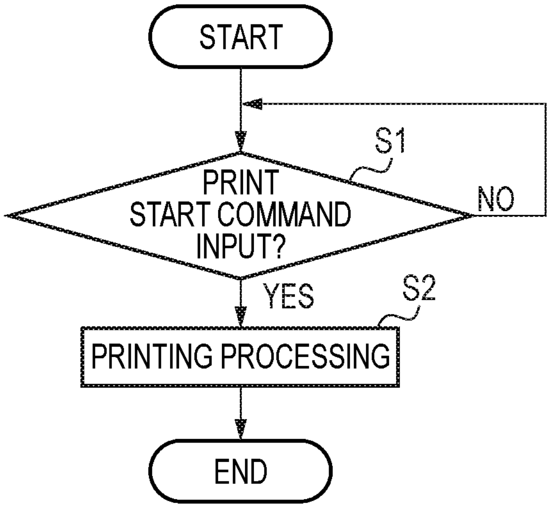
FIG. 8 is a flowchart showing an example of a processing procedure performed in a case where a print start command is input to the printing device shown in FIG. 1.

Control performed by the controller 80 in a case where an image is printed on the printing medium will be described with reference to FIG. 8. In a case where the operation portions 15 are operated by the user and the print start command is input to the printing device 1, the controller 80 is configured to read the control program from the ROM 82 and to operate to perform a flow shown in FIG. 8. Hereinafter, the flow in FIG. 8 will be described.

First, the controller 80 is configured to determine whether the print start command is input (step S1). The user applies the pretreatment liquid to the printing medium before operating the operation portions 15 and inputting the print start command. The pretreatment liquid may be applied from an application mechanism such as a spray or a head provided separately from the printing device 1 in a case where the print start command is input. Further, the printing medium (T-shirt) is disposed on the support surface 12*a* of the platen 12 before volatilization of the volatile component of the pretreatment liquid applied to the printing medium is completed. That is, the printing medium to which the pretreatment liquid has been applied can be immediately placed on the platen 12 without performing a special treatment such as drying. In the present embodiment, in a case where step S1 is processed, the printing medium immediately after the pretreatment liquid is applied is supported by the platen 12. Therefore, during a printing processing to be described later, the organic acid volatilizes from the pretreatment liquid applied to the printing medium. The platen 12 is disposed at the support position P1 in a case where the printing is not performed. In the printing device 1, in a case where the printing is not performed, the head 30 is normally disposed at the maintenance position B1, and capping is performed in which the plurality of nozzles of the head 30 are covered with a cap of the maintenance unit that is not shown.

In a case where the print start command is not input (step S1: NO), step S1 is repeated until the print start command is input. On the other hand, in a case where the print start command is input (step S1: YES), the controller 80 is configured to perform printing processing (step S2).

Figure 9A:
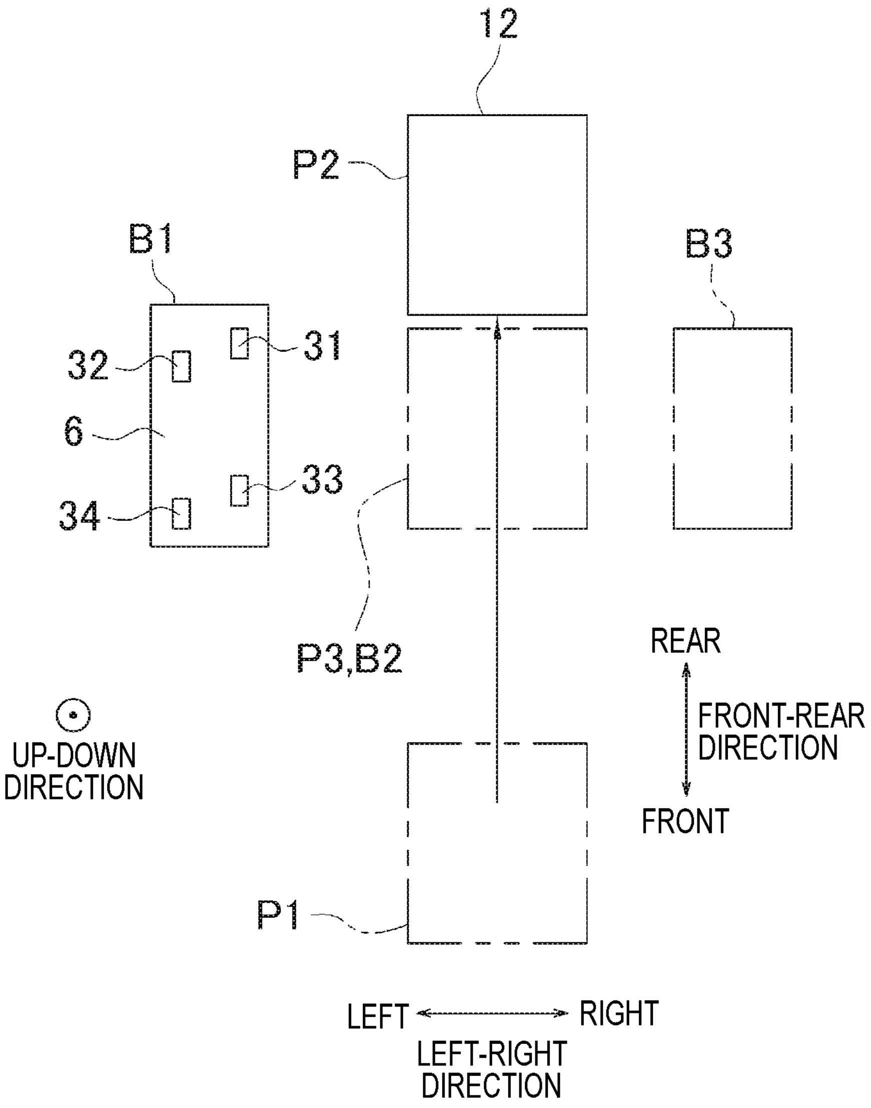
FIG. 9A is a diagram showing a situation in a case where a platen is conveyed from a support position to a pre-printing standby position.
Figure 9B:
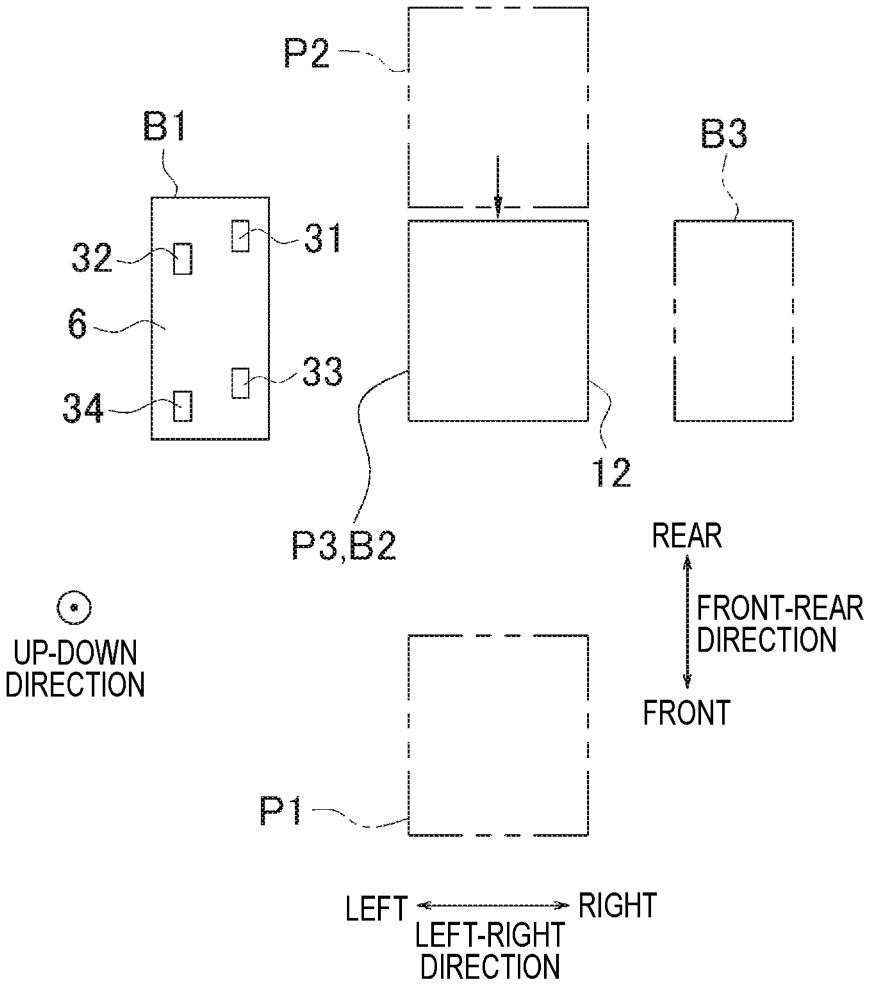
FIG. 9B is a diagram showing a situation in a case where the platen is conveyed from the pre-printing standby position to the printing position.

As shown in FIG. 9A, the controller 80 is configured to control the sub-scanning motor 26 based on the detection result from the encoder 261 to move the platen 12 from the support position P1 to the pre-printing standby position P2. Thereafter, as shown in FIG. 9B, the controller 80 is configured to control the sub-scanning motor 26 based on the detection result from the encoder 261 to move the platen 12 from the pre-printing standby position P2 to the printing position P3. At this time, the controller 80 is configured to perform uncapping to separate the cap from the head 30.

Further, the controller 80 is configured to control the main scanning motor 99 based on the detection result from the encoder 991 to move the carriage 6 from the maintenance position B1 to the ejection position B2 and to cause the head 30 to face the printing medium disposed on the platen 12. At this time, the controller 80 is configured to control the head driving units 301 to 304 such that the non-ejection drive is performed, in all of the nozzles 313, 323, 333, and 343 of the white heads 31 and 32 and the color heads 33 and 34, in all of the period until the head 30 moves from the maintenance position B1 to the ejection position B2.

The controller 80 may be configured to control the head driving units 301 to 304 such that the non-ejection drive is performed, in all of the nozzles 313, 323, 333, and 343 of the white heads 31 and 32 and the color heads 33 and 34, in a part of the period, corresponding to one or a plurality of printing cycles T, until the head 30 moves from the maintenance position B1 to the ejection position B2. By performing the non-ejection drive for the part of the period, the ink in the vicinity of the meniscus that reacts with the volatile component of the pretreatment liquid as described later is stirred with the ink on the upstream side. Therefore, it is possible to reduce an occurrence of a problem due to a reaction between the ink in the nozzle and the volatile component of the pretreatment liquid. The controller 80 may be configured to control the head driving units 301 to 304 such that the non-ejection drive is performed, in a part or all of the nozzles 313, 323, 333, and 343 of the white heads 31 and 32 and the color heads 33 and 34, in a part or all of the period until the head 30 moves from the maintenance position B1 to the ejection position B2.

In a state in which the platen 12 is located at the printing position P3 and the carriage 6 is located at the ejection position B2, the controller 80 is configured to control the head driving units 301 to 304, the main scanning motor 99, and the sub-scanning motor 26, and is configured to alternately repeat the ejection scanning and the movement of the platen 12 to the front to perform the printing on the printing medium. That is, at the time of printing on the printing medium, the platen 12 is conveyed forward from the pre-printing standby position P2 to the printing position P3, and thus the inks are ejected from the nozzles of the white heads 31 and 32 onto the printing medium to which the pretreatment agent is applied to form the base. Further, the inks are ejected from the nozzles of the color heads 33 and 34 onto the base formed on the printing medium by the white heads 31 and 32, to form the image. A white portion of the image is a base portion formed with the white ink. Therefore, the color ink is not ejected onto the base portion.

At the time of printing on such a printing medium, the controller 80 is configured to control the head driving units 303 and 304 such that, in a case where the platen 12 is not conveyed to a position where the platen 12 can face the color heads 33 and 34, the platen 12 is conveyed to a position where the platen 12 can face the white heads 31 and 32, and the nozzles 313 and 323 of the white heads 31 and 32 eject the inks to form the base on the printing medium, the non-ejection drive is performed, in all of the nozzles 333 and 343 of the color heads 33 and 34, in all of the period of the ejection scanning.

The controller 80 may be configured to control the head driving units 303 and 304 such that, in a case where the base is formed on the printing medium before the color heads 33 and 34 face the printing medium, the non-ejection drive is performed in all of the nozzles 333 and 343 of the color heads 33 and 34 during a part of the period, corresponding to one or a plurality of printing cycles T, of the ejection scanning. By performing the non-ejection drive for the part of the period, similarly to the above, it is possible to reduce the occurrence of the problem due to the reaction between the ink in the nozzle and the volatile component of the pretreatment liquid. The controller 80 may be configured to control the head driving units 303 and 304 such that, in a case where the base is formed on the printing medium before the color heads 33 and 34 face the printing medium, the non-ejection drive is performed in a part of the nozzles 333 and 343 of the color heads 33 and 34 during a part or all of the period of the ejection scanning.

At this time, the controller 80 is configured to control the head driving units 301 and 302 such that, in a case where the printing medium and the white heads 31 and 32 face each other, the non-ejection drive is performed in each of the nozzles 313 and 323 in all of the period other than an ejection period in which the white heads 31 and 32 perform the ejection drive to eject the inks from the nozzles 313 and 323 onto the printing medium. In a case where the ink is ejected once or more in the one printing cycle, the printing cycle is set as the ejection period.

The controller 80 may be configured to control the head driving units 301 and 302 such that, in a case where the printing medium and the white heads 31 and 32 face each other, the non-ejection drive is performed in each of the nozzles 313 and 323 in a part of the period, corresponding to one or a plurality of printing cycles T, other than the ejection period in which the white heads 31 and 32 perform the ejection drive to eject the inks from the nozzles 313 and 323 onto the printing medium. By performing the non-ejection drive for the part of the period, similarly to the above, it is possible to reduce the occurrence of the problem due to the reaction between the ink in the nozzle and the volatile component of the pretreatment liquid.

The controller 80 is configured to control the head driving units 301 to 304 such that, in a case where the platen 12 is conveyed to a position where the platen 12 can face the white heads 31 and 32 and the color heads 33 and 34, the inks are ejected from the nozzles 313 and 323 of the white heads 31 and 32 to form the base in the ejection scanning, and the inks are ejected from the nozzles 333 and 343 of the color heads 33 and 34 to form the image, the non-ejection drive is performed in each of the nozzles 313, 323, 333, and 343 in all of the period other than the ejection period.

The controller 80 may be configured to control the head driving units 301 to 304 such that, in a case where the inks are ejected from the nozzles 313 and 323 of the white heads 31 and 32 to form the base and the inks are ejected from the nozzles 333 and 343 of the color heads 33 and 34 to form the image in the ejection scanning, the non-ejection drive is performed, in each of the nozzles 313, 323, 333, and 343, in a part of the period, corresponding to one or a plurality of printing cycles T, other than the ejection period. Even in this case, by performing the non-ejection drive for the part of the period, similarly to the above, it is possible to reduce the occurrence of the problem due to the reaction between the ink in the nozzle and the volatile component of the pretreatment liquid.

The controller 80 is configured to control the head driving units 301 and 302 such that, in a case where the entire platen 12 passes through the white heads 31 and 32 and only the image is formed on the printing medium, the non-ejection drive is performed in all of the nozzles 313 and 323 of the white heads 31 and 32 during all of the period of the ejection scanning. That is, the controller 80 is configured to control the head driving units 301 and 302 such that, in a case where the printing medium faces the color heads 33 and 34 and the printing medium does not face the white heads 31 and 32, and the inks are ejected from the nozzles 333 and 343 of the color heads 33 and 34 to form the image on the printing medium, the non-ejection drive is performed in all of the nozzles 313 and 323 of the white heads 31 and 32 during all of the period of the ejection scanning.

The controller 80 may be configured to control the head driving units 301 and 302 such that, in a case where the entire platen 12 passes through the white heads 31 and 32 and only the image is formed on the printing medium, the non-ejection drive is performed in all of the nozzles 313 and 323 of the white heads 31 and 32 during a part of the period, corresponding to one or a plurality of printing cycles T, of ejection scanning. By performing the non-ejection drive for the part of the period, similarly to the above, it is possible to reduce the occurrence of the problem due to the reaction between the ink in the nozzle and the volatile component of the pretreatment liquid. Further, the controller 80 may be configured to control the head driving units 301 and 302 such that, in a case where the entire platen 12 passes through the white heads 31 and 32 and only the image is formed on the printing medium, the non-ejection drive is performed in a part of the nozzles 313 and 323 of the white heads 31 and 32 during a part or all of the period of the ejection scanning.

At this time, the controller 80 is configured to control the head driving units 303 and 304 such that, in a case where the printing medium and the color heads 33 and 34 face each other, the non-ejection drive is performed in each of the nozzles 333 and 343 in all of the period other than the ejection period.

The controller 80 may be configured to control the head driving units 303 and 304 such that, in a case where the printing medium and the color heads 33 and 34 face each other, the non-ejection drive is performed in each of the nozzles 333 and 343 in a part of the period, corresponding to one or a plurality of printing cycles T, other than the ejection period. Even in this case, by performing the non-ejection drive for the part of the period, similarly to the above, it is possible to reduce the occurrence of the problem due to the reaction between the ink in the nozzle and the volatile component of the pretreatment liquid.

Next, in a case where printing on the printing medium is finished, the controller 80 is configured to control the sub-scanning motor 26 based on a detection result from the encoder 261 to stop the platen 12 at the support position P1. The user removes the printing medium on which an image is formed from the platen 12 disposed at the support position P1. At this time, the controller 80 is configured to control the main scanning motor 99 based on a detection result from the encoder 991 to move the carriage 6 leftward from the ejection position B2 and to stop the carriage 6 at the maintenance position B1. Further, the controller 80 is configured to perform capping of the head 30 with the cap of the maintenance unit. In this way, a flow shown in FIG. 8 ends.

As described above, according to the printing device 1 of the present disclosure, in the ejection scanning, in a case where the head 30 and the printing medium face each other, it is possible to cause the head 30 to perform the non-ejection drive in all of the period other than the ejection period. By the non-ejection drive, it is possible to apply vibration to the ink to an extent that the ink is not ejected from the nozzle, and to stir the ink in the vicinity of the meniscus and the ink upstream of the meniscus. As described above, by performing the non-ejection drive in all of the period other than the ejection period, even in a case where the volatile component of the pretreatment liquid enters the nozzle, the ink in the vicinity of the meniscus that reacts with the volatile component of the pretreatment liquid is stirred with the ink on the upstream side. Therefore, it is possible to reduce the occurrence of the problem due to the reaction between the ink in the nozzle and the volatile component of the pretreatment liquid. As described above, it is possible to reduce the occurrence of the problem due to the reaction between the ink in the nozzle and the volatile component of the pretreatment liquid, and thus it is possible to use the pretreatment liquid containing the organic acid as the volatile component.

As described above, in the ejection scanning, in a case where the head 30 and the printing medium face each other, the head 30 may perform the non-ejection drive in the part of the period other than the ejection period. Although stirring frequency of the ink due to the non-ejection drive is lower than that in the above-described embodiment, the ink in the vicinity of the meniscus that reacts with the volatile component of the pretreatment liquid is stirred with the ink on the upstream side. Therefore, it is possible to reduce the occurrence of the problem due to the reaction between the ink in the nozzle and the volatile component of the pretreatment liquid.

The controller 80 is configured to perform the non-ejection drive, in all of the nozzles of the white heads 31 and 32 and the color heads 33 and 34, in all of the period until the head 30 moves from the maintenance position B1 to the ejection position B2, and to cause the head 30 to perform the non-ejection drive in all of the period other than the ejection period in a case where the head 30 and the printing medium face each other in the ejection scanning. That is, in a case where the head 30 moves in the main scanning direction, the controller 80 is configured to cause the head 30 to perform the non-ejection drive in all of the period other than the ejection period. Accordingly, it is possible to further reduce the occurrence of the problem due to the reaction between the inks in the nozzles 313, 323, 333, and 343 and the volatile component of the pretreatment liquid.

As a modification, the controller 80 may be not configured to perform the non-ejection drive until the head 30 moves from the maintenance position B1 to the ejection position B2.

Further, in the ejection scanning at the time of printing on the printing medium, the controller 80 is configured to perform the non-ejection drive in all of the nozzles 333 and 343 of the color heads 33 and 34 in a case where the base is formed on the printing medium before the color heads 33 and 34 face the printing medium. In the ejection scanning at the time of printing on the printing medium, the controller 80 is configured to execute the non-ejection drive in all of the nozzles 313 and 323 of the white heads 31 and 32 in a case where the entire platen 12 passes through the white heads 31 and 32 and the image is formed on the printing medium. That is, in a case where the inks are ejected from only either the white heads 31 and 32 or the color heads 33 and 34 (white heads or color heads), the other heads (color heads or the white heads) is configured to perform the non-ejection drive. Accordingly, it is possible to reduce the occurrence of the problem due to a reaction between the ink in the nozzle of the other head and the volatile component of the pretreatment liquid. In a case where the white heads 31 and 32 and the color heads 33 and 34 face the printing medium, and the inks are ejected from only either the white heads 31 and 32 or the color heads 33 and 34 (white heads or color heads), the same effect as described above can also be achieved by causing the other heads (color heads or white heads) to perform the non-ejection drive.

The white heads 31 and 32 and the color heads 33 and 34 are arranged side by side along the sub-scanning direction. Accordingly, in a state in which the printing medium faces the white heads 31 and 32 and the color heads 33 and 34, it is possible to perform, at the same timing, the ejection of the white inks from the white heads 31 and 32 that form the base on the printing medium and the ejection of the color inks from the color heads 33 and 34 that form the image on the base on the printing medium. Therefore, a printing time can be shortened.

In the above-described embodiment, the printing medium to which the pretreatment liquid is applied in advance is disposed on the platen 12 and the printing is performed on the printing medium, but the printing device 1 may include a pretreatment liquid application mechanism that applies, to the printing medium, the pretreatment liquid containing the same volatile component as described above. The same components as those of the above-described embodiment are denoted by the same reference numerals, and a description thereof will be omitted.

Figure 10:
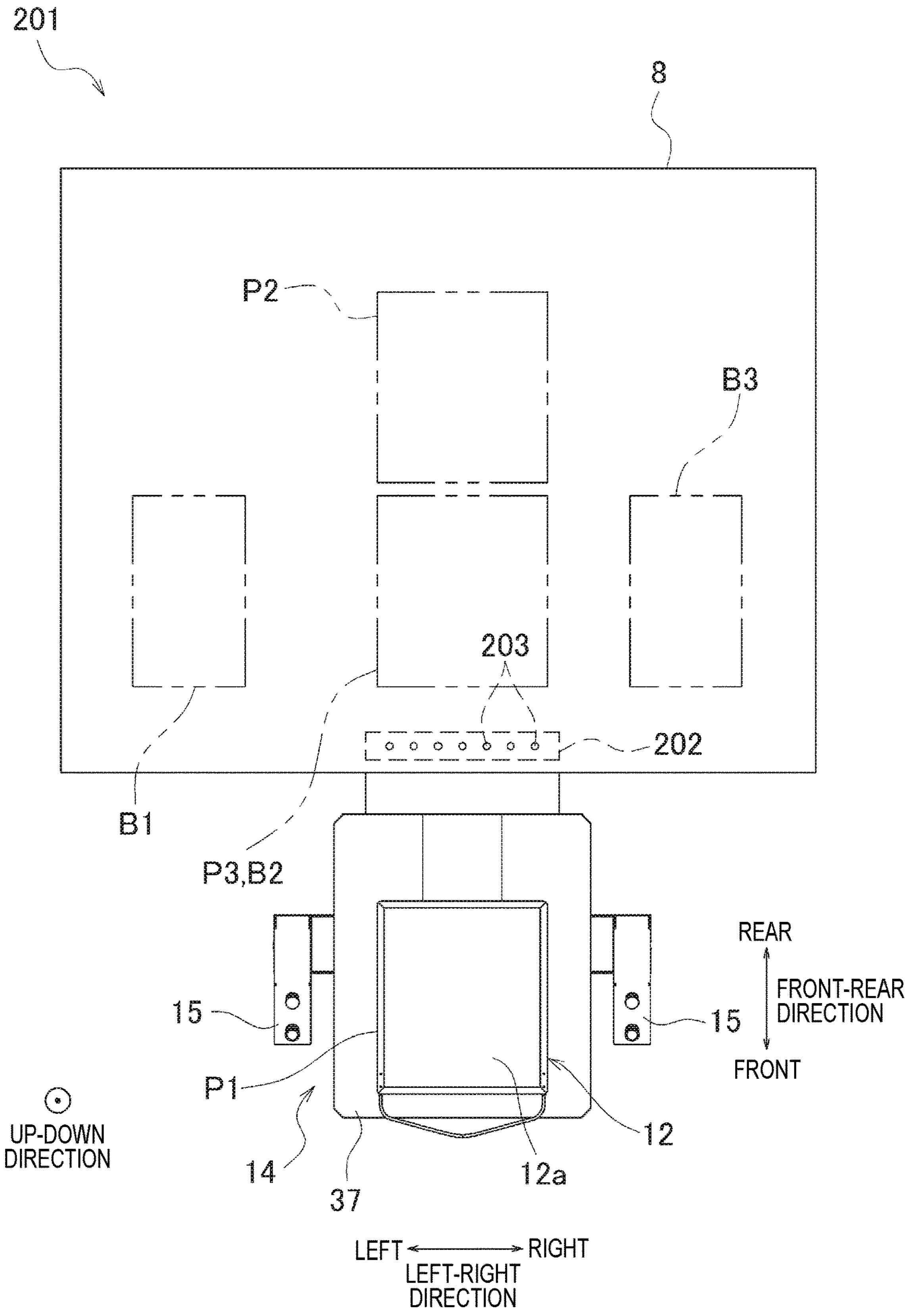
FIG. 10 is a schematic plan view of a printing device according to the present disclosure.

In a printing device 201, as shown in FIG. 10, a pretreatment liquid application mechanism 202 is disposed between the support position P1 and the printing position P3 in the front-rear direction. The pretreatment liquid application mechanism 202 is disposed inside the housing 8 and above the support surface 12*a* of the platen 12. The pretreatment liquid application mechanism 202 includes a plurality of nozzles 203 configured to eject a pretreatment liquid downward in a mist form. The plurality of nozzles 203 are arranged side by side along the left-right direction such that the pretreatment liquid is sprayed onto an entire upper surface of the printing medium. A reservoir (not shown) configured to store the pretreatment liquid is provided in the printing device 201, and the pretreatment liquid is supplied from the reservoir to the pretreatment liquid application mechanism 202.

<Control During Printing>

Figure 11:
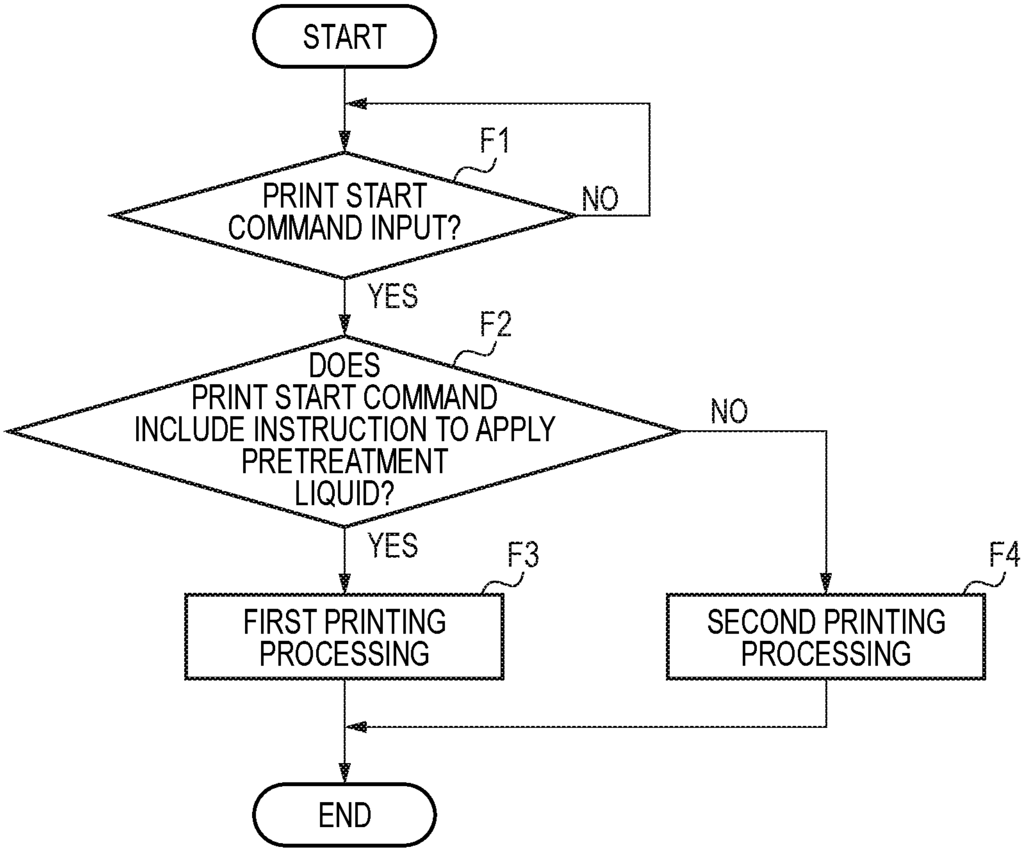
FIG. 11 is a flowchart showing an example of a processing procedure performed in a case where a print start command is input to the printing device shown in FIG. 10.

Control performed by the controller 80 in a case where an image is printed on the printing medium will be described with reference to FIG. 11. Similar to the above described embodiment, in a case where the operation portions 15 are operated by the user and the print start command is input to the printing device 201, the controller 80 is configured to read the control program from the ROM 82 and to operate to perform a flow shown in FIG. 11. Hereinafter, the flow in FIG. 11 will be described.

First, the controller 80 is configured to perform step F1 similar to step S1 described above. In the present modification, since the pretreatment liquid application mechanism 202 is provided, the user places, on the support surface 12*a* of the platen 12, the printing medium (T-shirt) to which the pretreatment liquid is not applied in advance before the user operates the operation portions 15 to input the print start command. In the present modification, in a case where step F1 is processed, the printing medium is supported by the platen 12. The platen 12 is disposed at the support position P1 in a case where the printing is not performed.

In a case where the print start command is not input (step F1: NO), step F1 is repeated until the print start command is input. On the other hand, in a case where the print start command is input (step F1: YES), the controller 80 is configured to determine whether the input print start command includes an instruction to apply the pretreatment liquid containing the volatile component to the printing medium (step F2).

In a case where the print start command includes an instruction to apply the pretreatment liquid (step F2: YES), the controller 80 is configured to perform a first printing processing (step F3). In the first printing processing in the present modification, the same printing processing as in the above-described embodiment is performed after the pretreatment liquid is applied to the printing medium.

The controller 80 is configured to control the sub-scanning motor 26 based on the detection result from the encoder 261 to move the platen 12 from the support position P1 to the pre-printing standby position P2. At this time, the controller 80 is configured to control the pretreatment liquid application mechanism 202 to spray the pretreatment liquid onto the printing medium in the mist form in a case where the printing medium passes through an area facing the plurality of nozzles 203. Accordingly, the pretreatment liquid can be applied to the upper surface of the printing medium.

Thereafter, the controller 80 is configured to control the sub-scanning motor 26 based on the detection result from the encoder 261 to move the platen 12 from the pre-printing standby position P2 to the printing position P3. At this time, the controller 80 is configured to perform uncapping to separate the cap from the head 30. Further, a printing processing similar to that of the above-described embodiment is performed to form the image on the printing medium.

Next, in a case where the printing on the printing medium based on the print data is finished, the controller 80 is configured to control the sub-scanning motor 26 based on the detection result from the encoder 261 to stop the platen 12 at the support position P1. The user removes the printing medium on which the image is formed from the platen 12 disposed at the support position P1. At this time, the controller 80 is configured to control the main scanning motor 99 based on the detection result from the encoder 991 to move the carriage 6 leftward from the ejection position B2 and to stop the carriage 6 at the maintenance position B1. Further, the controller 80 is configured to perform capping of the head 30 with the cap of the maintenance unit. In this way, the flow shown in FIG. 11 ends.

On the other hand, in step F2, in a case where the print start command does not include an instruction to apply the pretreatment liquid (step F2: NO), the controller 80 is configured to perform a second printing processing (step F4). The second printing processing in the present modification is mainly performed at the time of printing a test pattern for confirming presence or absence of the ejection from the nozzle of the head 30, but is not particularly limited, and corresponds to a general printing processing of ejecting the ink onto the printing medium to which the pretreatment liquid is not applied. In the second printing processing, the non-ejection drive in the above-described printing processing is not performed.

In the second printing processing, the platen 12 is moved from the support position P1 to the pre-printing standby position P2, in which the printing medium (for example, paper) to which the pretreatment liquid is not applied is disposed on the platen 12. Thereafter, the platen 12 is moved from the pre-printing standby position P2 to the printing position P3. Further, the carriage 6 is moved from the maintenance position B1 to the ejection position B2 such that the head 30 faces the printing medium disposed on the platen 12. Thereafter, based on the print data, the ejection scanning and forward movement of the platen 12 are alternately repeated to perform the printing on the printing medium.

Next, in a case where the printing on the printing medium based on the print data is finished, the controller 80 is configured to control the sub-scanning motor 26 based on the detection result from the encoder 261 to stop the platen 12 at the support position P1. The user removes the printing medium on which the image is formed from the platen 12 disposed at the support position P1. At this time, the controller 80 is configured to control the main scanning motor 99 based on the detection result from the encoder 991 to move the carriage 6 leftward from the ejection position B2 and stop the carriage 6 at the maintenance position B1. Further, the controller 80 is configured to perform capping of the head 30 with the cap of the maintenance unit. In this way, the flow shown in FIG. 11 ends.

As described above, since the printing device 201 includes the pretreatment liquid application mechanism 202, it is possible to apply the pretreatment liquid to the printing medium. Therefore, it is not necessary to apply the pretreatment liquid to the printing medium in advance.

In a case in which the pretreatment liquid is not applied to the printing medium (step F2: NO), the controller 80 is configured not to perform the non-ejection drive in step F4. At this time, since the pretreatment liquid containing the volatile component is not applied to the printing medium, the ink in the nozzle does not react with the volatile component of the pretreatment liquid. In this way, in a case where the problem due to the reaction between the ink and the volatile component does not occur, it is possible to reduce power consumption without executing the non-ejection drive.

The pretreatment liquid application mechanism 202 is configured to spray the pretreatment liquid onto the printing medium in the mist form. Accordingly, it is possible to apply a large amount of pretreatment liquid over a wide range of the printing medium in a short time. The pretreatment liquid application mechanism 202 is not particularly limited as long as the pretreatment liquid can be applied to the printing medium. For example, the pretreatment liquid may be applied to the printing medium by a roller, or the pretreatment liquid may be discharged from the nozzle in a form other than the mist form and applied to the printing medium.

The pretreatment liquid application mechanism 202 may be configured to selectively apply the pretreatment liquid containing the volatile component and the pretreatment liquid not containing the volatile component to the printing medium. In this case, in a case where the pretreatment liquid not containing the volatile component is applied to the printing medium, first, the pretreatment liquid not containing the volatile component is applied to the printing medium, as in the application of the pretreatment liquid to the printing medium performed in the first printing process, and thereafter, the printing may be performed on the printing medium without performing the non-ejection drive as in the second printing processing.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

In the embodiment described above, the base printing which forms the base on the printing medium to which the pretreatment liquid is applied and image printing which forms the image on the base are performed, during one conveyance processing in which the platen 12 is conveyed from the pre-printing standby position to the support position. However, only the base printing may be performed during a first conveyance processing, and only the image printing may be performed during a second conveyance processing. In this case, in a case where the head 30 is moving in the main scanning direction during the first conveyance processing, the non-ejection drive may be continuously or intermittently performed in the nozzles of the color heads 33 and 34, and in a case where the head 30 is moving in the main scanning direction during the second conveyance processing, the non-ejection drive may be continuously or intermittently performed in the nozzles of the white heads 31 and 32.

The platen 12 in the above-described embodiment is moved along the sub-scanning direction (front-rear direction) together with the printing medium by the conveyance mechanism 14, but the platen 12 may be disposed in a manner of not being movable to the printing position P3. In this case, the platen 12 is only required to support, at the printing position P3, the printing medium (for example, paper or roll paper) to be conveyed.

The head 30 in the above-described embodiment has been described as an example in which the present disclosure is applied to a printing device including a serial head configured to eject inks from a plurality of nozzles while being moved along the main scanning direction (left-right direction) by the moving mechanism 77, but the present disclosure is not limited thereto. For example, the present disclosure may be applied to a printing device including a line head that extends over an entire length of the printing medium (platen 12) in the main scanning direction and is disposed in a manner of not being movable to the ejection position B2. In this case, in a case where the printing medium is conveyed in the sub-scanning direction and the head faces the printing medium, to which the pretreatment liquid is applied, the non-ejection drive may be performed at the same timing as described above.

In the above-described embodiment, a microcomputer, an application specific integrated circuits (ASIC), a field programmable gate array (FPGA), or the like may be used as a processor instead of the CPU 81. In this case, main processing may be distributed by a plurality of processors. A non-transitory storage medium such as the ROM 82 and the flash memory 84 may be any storage medium configured to keep information regardless of a storage period of the information. The non-transitory storage medium may not include a transitory storage medium (for example, a signal to be transmitted). For example, the control program may be downloaded (that is, transmitted as a transmission signal) from a server connected to a network (not shown) and stored in the ROM 82 or the flash memory 84. In this case, the control program may be stored in the non-transitory storage medium such as an HDD provided in the server.

What is claimed is:

1. A printing device comprising:

a head including a nozzle configured to eject ink;

a platen configured to support a printing medium to which a pretreatment liquid is applied, the pretreatment liquid containing a volatile component that reacts with the ink; and a controller configured to:

cause the head to perform an ejection drive that causes the nozzle to eject the ink and a non-ejection drive that causes the nozzle not to eject the ink; and cause the head to perform the non-ejection drive in at least a part of a period other than an ejection period in which the head performs the ejection drive to cause the nozzle to eject the ink toward the printing medium, at a position where the head and the printing medium face each other.

2. The printing device according to claim 1, further comprising:

a moving mechanism configured to move the head in one direction relative to the platen, wherein the controller is configured to cause the head to perform the non-ejection drive in at least a part of the period other than the ejection period, in a case where the head is moving in the one direction.

3. The printing device according to claim 2, wherein the controller is configured to cause the head to perform the non-ejection drive in all of the period other than the ejection period, in the case where the head is moving in the one direction.

4. The printing device according to claim 1, wherein the head includes:

a first head portion including a nozzle configured to eject a first ink; and a second head portion including a nozzle configured to eject a second ink onto the first ink, the second ink being different from the first ink, and in a case where the controller is configured to cause one of the first head portion and the second head portion to perform the ejection drive, the controller is configured to cause an other head portion of the first head portion and the second head portion to perform the non-ejection drive.

5. The printing device according to claim 4, further comprising:

a moving mechanism configured to move the head in one direction relative to the platen, wherein the first head portion and the second head portion are arranged side by side along an intersecting direction intersecting the one direction.

6. The printing device according to claim 1, further comprising:

a pretreatment liquid application mechanism configured to apply the pretreatment liquid to the printing medium.

7. The printing device according to claim 6, wherein the controller is configured not to cause the head to perform the non-ejection drive, in a case where the pretreatment liquid is not applied to the printing medium by the pretreatment liquid application mechanism.

8. The printing device according to claim 6, wherein the pretreatment liquid application mechanism is configured to spray, in a mist form, the pretreatment liquid onto the printing medium.

9. The printing device according to claim 1, wherein the pretreatment liquid contains an organic acid, as the volatile component.

10. A non-transitory computer readable storage medium storing a control program used in a printing device including a head including a nozzle configured to eject ink, a platen configured to support a printing medium to which a pretreatment liquid is applied, the pretreatment liquid containing a volatile component that reacts with the ink, and a controller, the control program, when executed by the controller of the printing device, causes the controller to cause:

the head to perform an ejection drive that causes the nozzle to eject the ink and a non-ejection drive that causes the nozzle not to eject the ink; and the head to perform the non-ejection drive in at least a part of a period other than an ejection period in which the head performs the ejection drive to cause the nozzle to eject the ink toward the printing medium, at a position where the head and the printing medium face each other.

* * * * *